(12) United States Patent
Pancurák

(10) Patent No.: US 12,473,215 B2
(45) Date of Patent: Nov. 18, 2025

(54) POLARIZATION AND TURBULENT WATER IONIZER INTENDED FOR WHITE AND SANITARY CONVENIENCES

(71) Applicant: Swiss Aqua Technologies AG, Cham (CH)

(72) Inventor: Frantisek Pancurák, Prešov (SK)

(73) Assignee: Swiss Aqua Technologies AG, Cham (CH)

( * ) Notice: Subject to any disclaimer, the term of this patent is extended or adjusted under 35 U.S.C. 154(b) by 726 days.

(21) Appl. No.: 17/794,392

(22) PCT Filed: Jan. 14, 2021

(86) PCT No.: PCT/EP2021/050700
§ 371 (c)(1),
(2) Date: Jul. 21, 2022

(87) PCT Pub. No.: WO2021/148305
PCT Pub. Date: Jul. 29, 2021

(65) Prior Publication Data
US 2022/0388877 A1    Dec. 8, 2022

(30) Foreign Application Priority Data

Jan. 21, 2020 (SK) .......................................... 4-2020

(51) Int. Cl.
*C02F 1/461*      (2023.01)
(52) U.S. Cl.
CPC ...... *C02F 1/46176* (2013.01); *C02F 1/46109* (2013.01); *C02F 2001/46157* (2013.01);
(Continued)
(58) Field of Classification Search
CPC .............. C02F 1/46176; C02F 1/46109; C02F 2001/46157; C02F 2001/46171;
(Continued)

(56) References Cited

U.S. PATENT DOCUMENTS

| | | | | |
|---|---|---|---|---|
| 4,325,798 A | * | 4/1982 | Mack | C02F 1/4602 204/288.2 |
| 5,358,617 A | * | 10/1994 | Ibbott | C02F 1/4602 204/290.14 |
| 2012/0037497 A1 | * | 2/2012 | Pancurak | C02F 1/46176 204/248 |

FOREIGN PATENT DOCUMENTS

| | | |
|---|---|---|
| SK | 5817 Y1 | 8/2011 |
| WO | 1994017000 A1 | 8/1994 |
| WO | WO-2019043004 A1 * | 3/2019 |

OTHER PUBLICATIONS

Swiss Aqua Technologies, IPS WashBall Efficiency & Protection, Product sales manual, Test Report, Leaflet.
(Continued)

*Primary Examiner* — Bryan D. Ripa
(74) *Attorney, Agent, or Firm* — Rivka Friedman

(57) ABSTRACT

The polarization and turbulent water ionizer intended for white goods and sanitary appliances comprising a hollow body with a system of through-flow openings for inlet and outlet of water fitted with systems of electrodes arranged inside in an alternating manner, made of differently conductive materials and stabilized within spacers is further resolved in a manner where the cylindrical or flat electrodes (1) of the anode and of the electrodes (2) of the cathode have turbulent openings (3) and/or deflected turbulent fans (4), where the hollow body (5) is fitted with a shield (6) protecting against electromagnetic field. In one embodiment the axes of the cylindrical electrodes (1) of the anode and of the electrodes (2) of the cathode are arranged inside the hollow body (5) and oriented perpendicularly to the through-flow openings (7). In the other case, the axes of the flat electrodes (1) of the anode and of the electrodes (2) of the cathode are arranged inside the hollow body (5) and oriented axially with reference to the through-flow openings (7). The (Continued)

Figure 1:
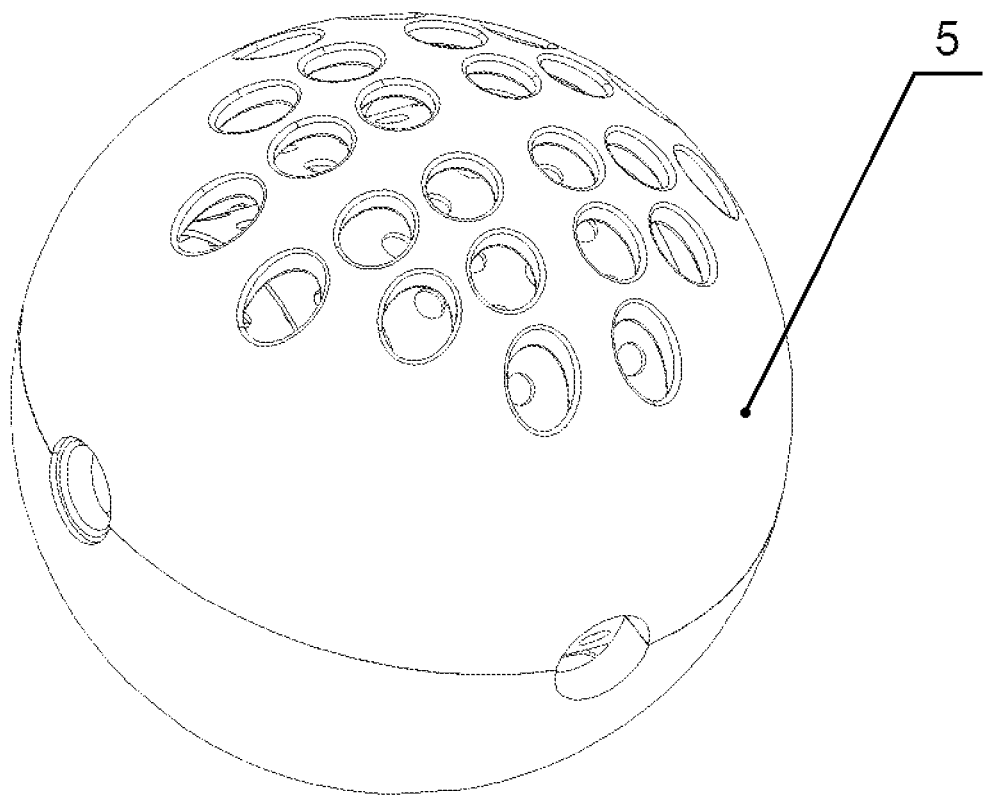

shield (6) protecting against electromagnetic field applied on the inner side of the hollow body (5) refers to a metallic grid/gauze and/or a metallic plate.

4 Claims, 5 Drawing Sheets

(52) U.S. Cl.
 CPC ............... *C02F 2001/46171* (2013.01); *C02F 2201/003* (2013.01); *C02F 2301/024* (2013.01); *C02F 2303/22* (2013.01)

(58) Field of Classification Search
 CPC .......... C02F 2201/003; C02F 2301/024; C02F 2303/22; C02F 2307/12; C02F 1/4602
 See application file for complete search history.

(56) References Cited

OTHER PUBLICATIONS

IPS Washball Results, Clearview, Dec. 10, 2019.
IPS Washball Amazon Search Results.

* cited by examiner

POLARIZATION AND TURBULENT WATER IONIZER INTENDED FOR WHITE AND SANITARY CONVENIENCES

FIELD OF THE INVENTION

The invention discloses a polarization and turbulent water ionizer intended for white goods and sanitary appliances to prevent scale formation. The invention concerns the field of water management.

BACKGROUND OF THE INVENTION

The state of the art provides commonly known galvanic items of equipment for water treatment, however, such items of equipment are declared for industrial application to eliminate scale formation whose design is adapted accordingly. One item of equipment for galvanic water treatment is sufficiently disclosed and published in international patent application WO 94/17000. The equipment comprises a tube where segments made of zinc are positioned together with an axial tubular structure fitted with dished faces where the segments serve as sacrificial anodes. A disadvantage of this system is its relatively great length, which eliminates other than industrial application, such as its application in washing machines, dishwashers or WC flushing cisterns.

Galvanic treatment of water is known, for example, from the Slovak utility design 5817 disclosing simple equipment for galvanic water treatment. This equipment concerns an ionizing cartridge with electrodes made of two different metals that are positioned in an alternating manner. The arrangement of the electrodes in the cartridge is fixed. The flow of liquid between the electrodes is directed by a deflection of individual segments of the electrodes. Compared to the other, already existing items of equipment, this one performs better. On the other hand, this application of an ionizing cartridge involves certain limitations. In particular, the short-time exposure of liquid to the galvanic effect of the electrodes resulting in the effect taking place only during one-time flow of liquid through this ionizing cartridge.

In addition, designed for washing machines there are so-called X-ball washing balls comprising a hollow spherical body with a system of through-flow openings for water inlet and outlet on one and the other side. The sphere includes a system of electrodes arranged in an alternating manner and made of different conducting materials stabilized in spacers. The electrodes have the shape of circular solid plates. The electrodes are oriented with reference to the system of inlet and outlet openings in a manner allowing water to flow along a single line in the gaps between the electrodes directly from the inlet openings to the outlet openings smoothly, with no turbulence, being a disadvantage of the washing ball as it results in its insufficient efficiency.

The absence of suitable, efficient, and available water ionizers has resulted in the opportunity to design such items of equipment for the galvanic treatment of water, in particular to do the washing in washing machines, to do the dishes in dishwashers or to decalcify water in WC flushing cisterns, which would provide for water treatment using simple, inexpensive and highly efficient equipment available to the general public. The effort resulted in designing the polarization and turbulent water ionizer intended for white goods and sanitary appliances to prevent scale formation disclosed further in the invention.

SUMMARY OF THE INVENTION

The aforementioned deficiencies have been removed by the construction of the polarization and turbulent water ionizer intended for white goods and sanitary appliances to eliminate scale formation, which is based on the physical treatment of water where water flowing through the ionizer and creating a wet galvanic cell with the electrodes induces "transmission" or deposition of a free electric charge onto individual molecules of water that polarize as a result. This effect results in a change of the shape of solid substances soluble in water, meaning that they no longer substantially form crystal lattice, with water clusters becoming smaller, i.e. clusters originally comprising on average 15 molecules now comprise approximately only 5 molecules per cluster. The essence of the present invention rests in the fact that the TGP effect, i.e. the effect of turbulent galvanic polarization, is utilized where the flow of through-flowing water has an advancing and turbulent direction in an ionizer with a simple design.

The polarization and turbulent water ionizer intended for white goods and sanitary appliances according to the invention comprises a hollow body with a system of through-flow openings for inlet and outlet of water fitted with systems of electrodes arranged inside the hollow body in an alternating manner and made of differently conductive materials, which are stabilized within spacers, where the cylindrical or flat electrodes of the anode and the electrodes of the cathode have turbulent openings and/or deflected turbulent fans. The hollow body is fitted with a shield protecting against electromagnetic field to attain a better efficiency of water ionization. In a preferred embodiment, the hollow body is made of plastic material and is ball-shaped. The ionizer can be implemented in two basic ways. In one embodiment, the axes of the cylindrical electrodes of the anode and of the electrodes of the cathode are inside the hollow body oriented perpendicularly to the through-flow openings in the hollow body. In the other embodiment, the axes of the flat electrodes of the anode and of the electrodes of the cathode are inside the hollow body oriented axially with reference to the through-flow openings in the hollow body. In both cases the shield protecting against electromagnetic field applied onto the inner side of the hollow body refers to a metallic grid/gauze and/or a metallic plate. The protecting shield can be embedded in the skeleton of the hollow body. The aforementioned electrodes are made of, for example, a combination of conductive materials, such as the following combinations: silver-titanium, silver-platinum, copper-zinc, brass-zinc, stainless steel-zinc, copper-aluminium, brass-aluminium, etc.

The advantages of the polarization and turbulent water ionizer intended for white goods and sanitary appliances to eliminate scale formation according to the present invention are obvious due to the demonstrated effects. The effects of this technical solution rest in particular in its all-purpose utilization for water processing and treatment by this polarization and turbulent water ionizer whose operation is automatic, requires no chemical substances, no magnets and no external source of energy. Due to through-flowing water, the electrodes, made of different conductive materials, change the structure of calcium thus depriving it of its ability to form scale.

A significant advantage of this polarization and turbulent water ionizer according to the present invention compared to the existing items of equipment rests above all in its high efficiency due to improved water turbulence in the galvanic field attained by a change in the orientation and design of the electrodes, and also in its high efficiency resulting from protecting the electrodes against electromagnetic fields that compromise the efficiency of polarization.

OVERVIEW OF FIGURES IN DRAWINGS

The polarization and turbulent water ionizer intended for white goods and sanitary appliances to eliminate scale formation according to the present invention will be explained in detail hereunder using drawings where FIG. 1 provides the polarization and turbulent water ionizer in an axonometric projection.

Figure 2:
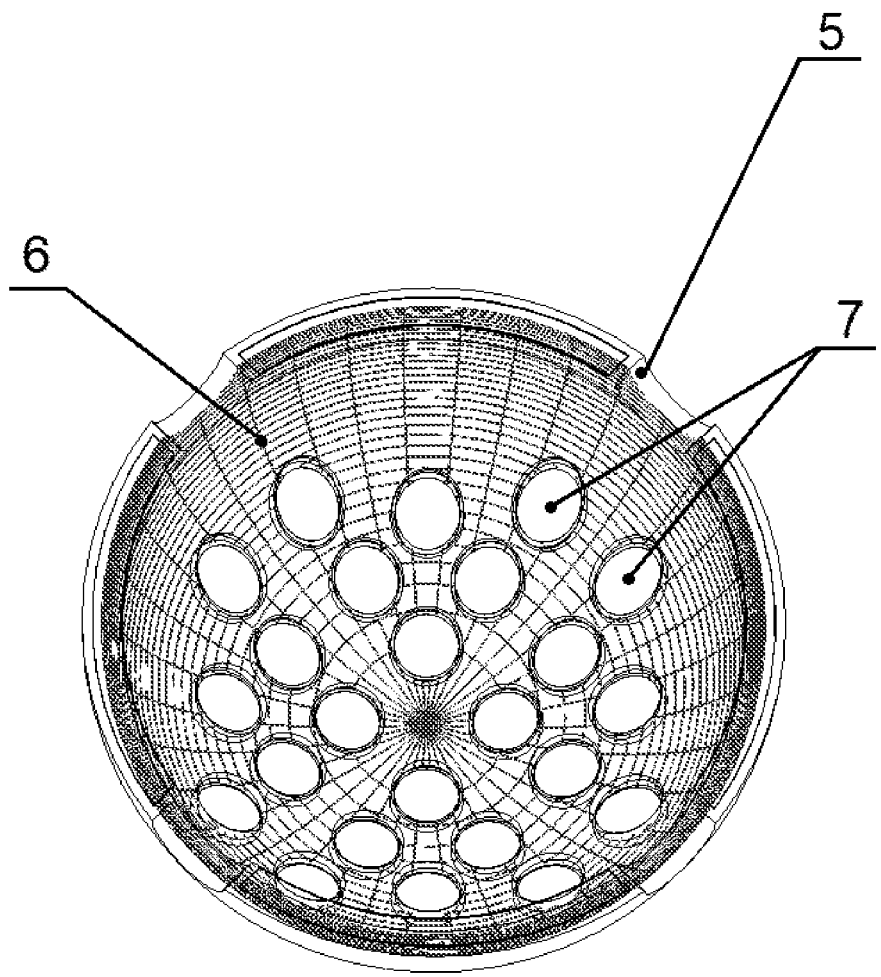

FIG. 2 provides a view of the inside of the body where the protecting shield can be seen.

Figure 3:
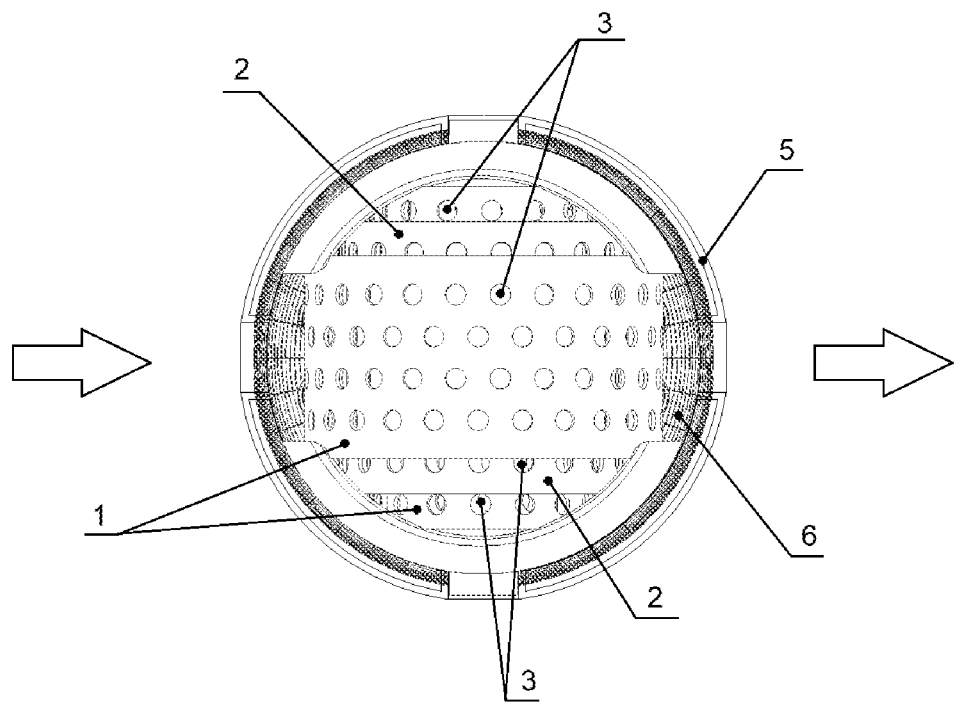

FIG. 3 provides a sectional view of the cylindrical arrangement of the electrodes with turbulent openings.

Figure 4:
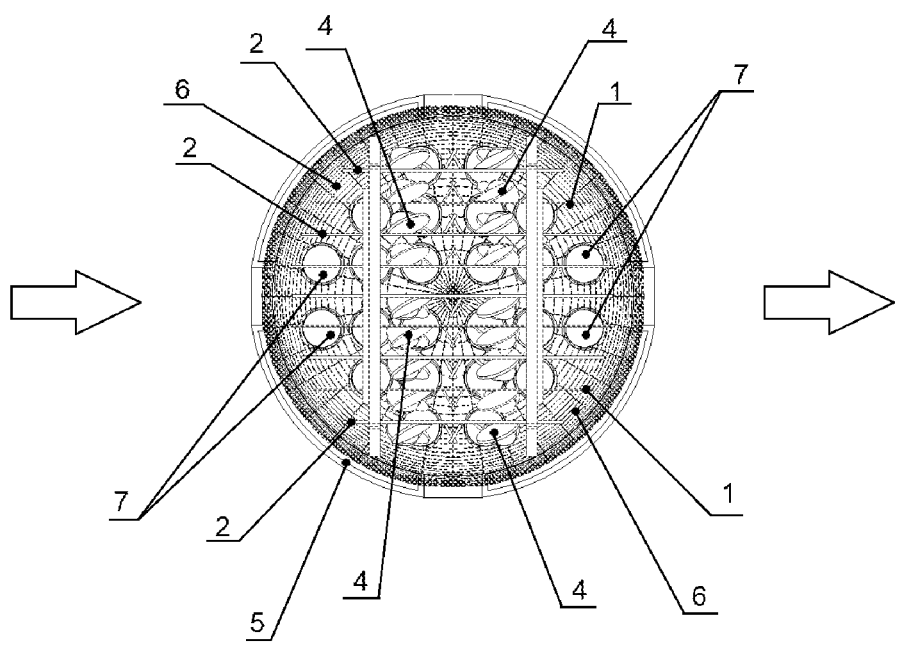

FIG. 4 provides a sectional view of the arrangement of the flat electrodes with turbulent fans.

Figure 5:
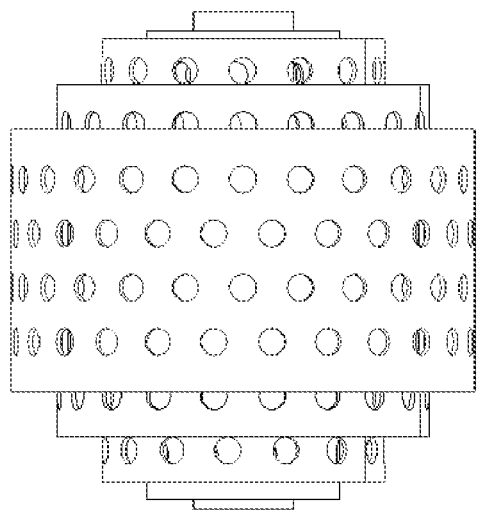

FIG. 5 provides a side view of the cylindrical arrangement of the electrodes with turbulent openings.

Figure 6:
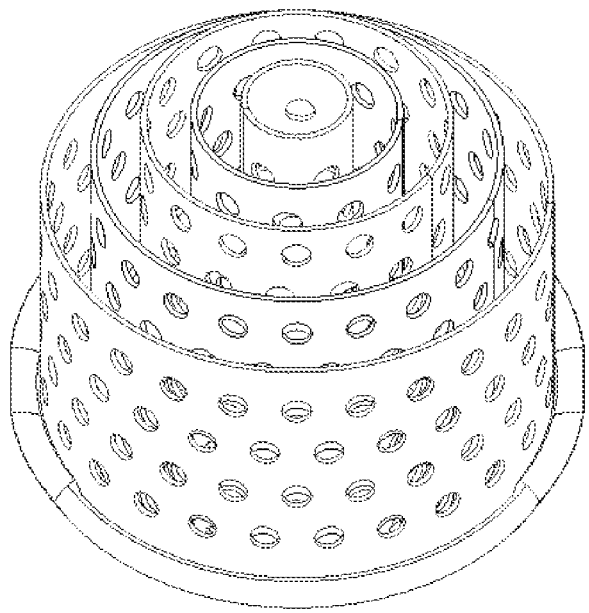

FIG. 6 provides an axonometric projection of the cylindrical arrangement of the electrodes with turbulent openings.

Figure 7:
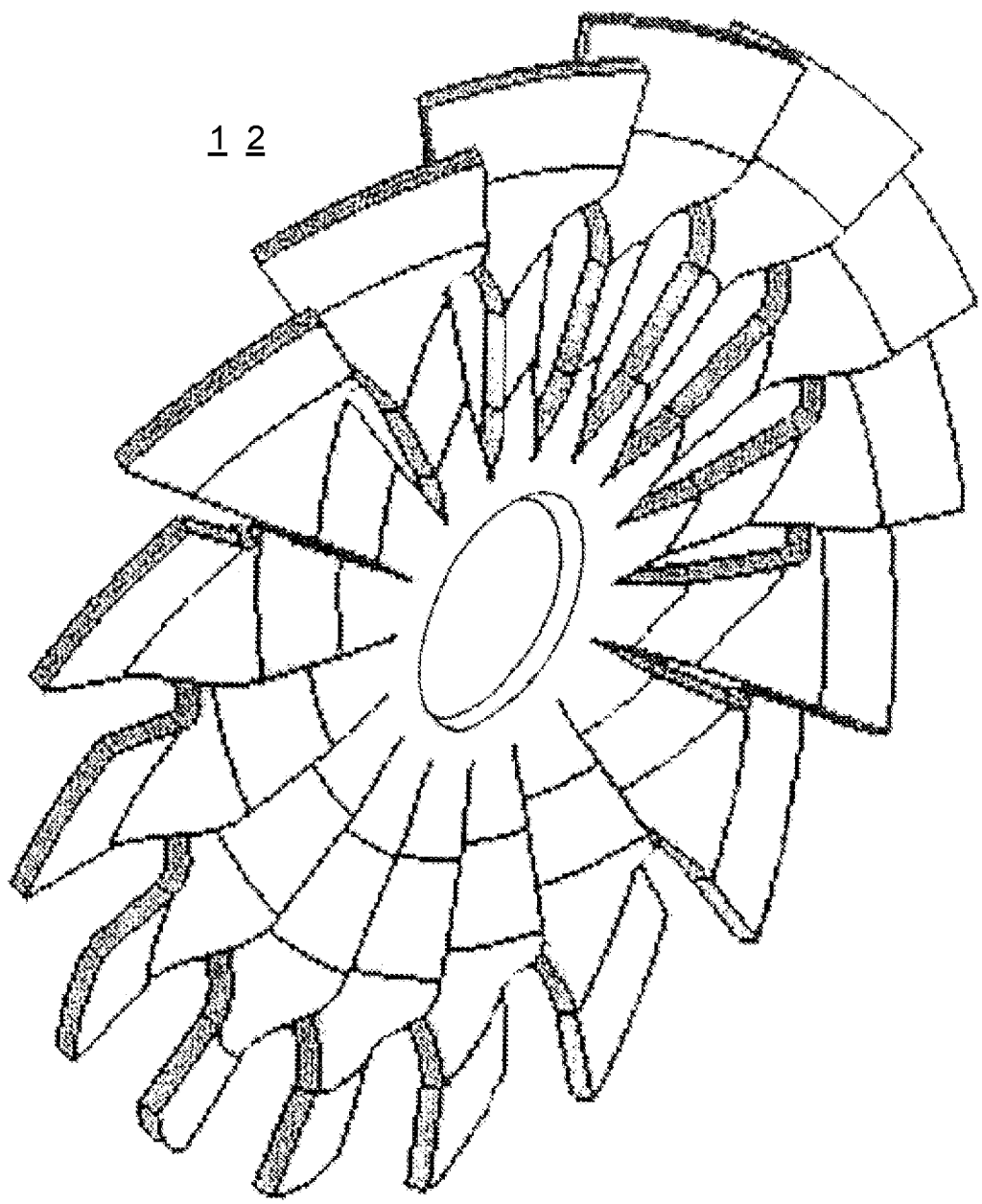

FIG. 7 provides one possible design of the flat electrode with turbulent fans.

EXAMPLES OF THE INVENTION EMBODIMENTS

It is understood that individual embodiments of the polarization and turbulent water ionizer intended for white goods and sanitary appliances to eliminate scale formation according to the invention are presented for illustration purposes without any limitations of technical solutions. Persons familiar with the state of the art will find or be able to find out by way of no more than routine experiment many equivalents to specific embodiments of the invention. Such equivalents will then also be included in the scope of the following claims.

Persons skilled in the art will have no problems with dimensioning the polarization and turbulent water ionizer and with appropriate selection of materials and design-based arrangements, and therefore such parameters are not presented in detail.

Example 1

In this example, one embodiment of the polarization and turbulent water ionizer intended for white goods and sanitary appliances to eliminate scale formation according to the invention that is provided in FIGS. 1 and 3 is disclosed. It comprises a hollow body 5 with a system of through-flow openings 7 for water inlet and outlet fitted with systems of electrodes 1 of the anode and of the electrodes 2 of the cathode arranged inside the hollow body in an alternating manner, which are made of different conductive materials and stabilized within spacers. The hollow body 5 is fitted with a shield 6 protecting against electromagnetic field to attain a better efficiency of water ionization as provided in FIG. 2. The shield 6 protecting against electromagnetic field applied on the inner side of the hollow body 5 refers to a metallic grid/gauze and/or a metallic plate. The protecting shield 6 can be embedded in the skeleton of the hollow body 5. In a preferred embodiment, the hollow body 5 is made of plastic material and is ball-shaped. In this case, the ionizer is implemented with the axes of the cylindrical electrodes 1 of the anode and of the electrodes 2 of the cathode arranged inside the hollow body 5 and oriented perpendicularly to the through-flow openings 7 in the hollow body 5. The cylindrical electrodes 1 of the anode and the electrodes 2 of the cathode have turbulent openings 3, as disclosed in detail in FIGS. 5 and 6.

Example 2

In this example, the other embodiment of the polarization and turbulent water ionizer intended for white goods and sanitary appliances to eliminate scale formation according to the invention that is provided in FIGS. 1 and 4 is disclosed. It comprises a hollow body 5 fitted with a system of through-flow openings 7 for water inlet and outlet comprising the systems of the electrodes 1 of the anode and of the electrodes 2 of the cathode arranged inside the hollow body in an alternating manner, which are made of different conductive materials and stabilized within spacers. The hollow body 5 is fitted with a shield 6 protecting against electromagnetic field to attain a better efficiency of water ionization as provided in FIG. 2. The shield 6 protecting against electromagnetic field applied on the inner side of the hollow body 5 refers to a metallic grid/gauze and/or a metallic plate. The protecting shield 6 can be embedded in the skeleton of the hollow body 5. In a preferred embodiment, the hollow body 5 is made of plastic material and is ball-shaped. In this case, the ionizer is implemented with the axes of the flat electrodes 1 of the anode and of the electrodes 2 of the cathode arranged inside the hollow body 5 oriented axially with reference to the through-flow openings z in the hollow body 5. In a possible embodiment, the flat electrodes 1 of the anode and of the electrodes 2 of the cathode have deflected turbulent fans 4, as disclosed in detail in FIG. 7.

In both examples, the aforementioned electrodes are made of, for example, combinations of conductive materials, such as the following combinations: silver-titanium, silver-platinum, copper-zinc, brass-zinc, stainless steel-zinc, copper-aluminium, brass-aluminium, etc.

INDUSTRIAL APPLICABILITY

The polarization and turbulent water ionizer intended for white goods and sanitary appliances to eliminate scale formation according to the invention may be utilized in washing lines, laundries, and WC flushing cisterns.

The invention claimed is:

1. A polarization and turbulent water ionizer intended for white goods and sanitary appliances comprising a hollow body with a system of through-flow openings for inlet and outlet of water fitted with systems of electrodes comprising of an anode and a cathode, arranged inside the hollow body in an alternating manner and made of differently conductive materials and stabilized within spacers, characterized in that the electrodes (1) of the anode and the electrodes (2) of the cathode are in cylindrical arrangement and have turbulent openings (3) or the electrodes (1) of the anode and the electrodes (2) of the cathode are flat and have turbulent fans (4), where the hollow body (5) is fitted with a shield (6) protecting against electromagnetic field, said shield (6) is a metallic grid/gauze and/or a metallic plate.

2. The polarization and turbulent water ionizer according to claim 1, characterized in that the axes of the cylindrical electrodes (1) of the anode and of the electrodes (2) of the cathode are arranged inside the hollow body (5) and oriented perpendicularly to the through-flow openings (7).

3. The polarization and turbulent water ionizer according to claim 1, characterized in that the axes of the flat electrodes (1) of the anode and of the electrodes (2) of the cathode are arranged inside the hollow body (5) and oriented axially with reference to the through-flow openings (7).

4. The polarization and turbulent water ionizer according to claim 1, characterized in that the shield (6) protecting against electromagnetic field is applied on the inner side of the hollow body (5).

\* \* \* \* \*